A. MILLER.
Bails and Ears for Buckets.
No. 149,594.              Patented April 14, 1874.
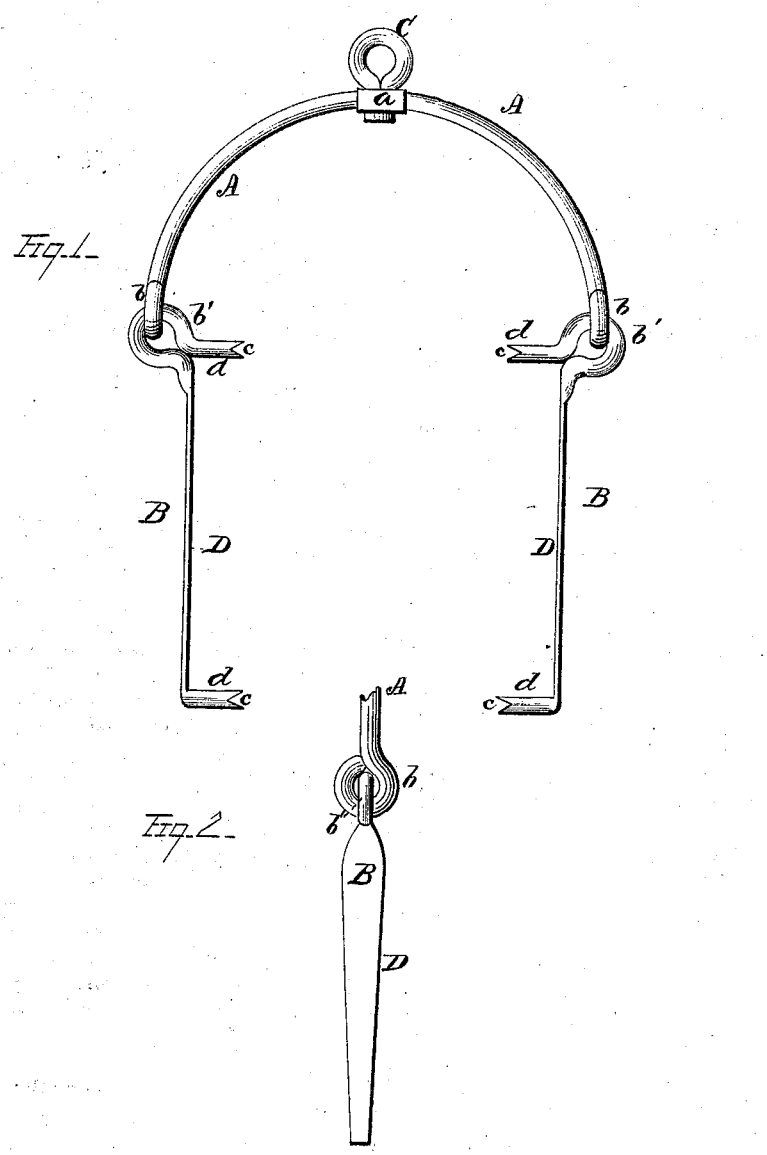
WITNESSES.
INVENTOR.
Alfred Miller,
By Leggett & Leggett,
Attorneys.

UNITED STATES PATENT OFFICE.

ALFRED MILLER, OF CINCINNATI, OHIO, ASSIGNOR TO CHARLES H. WATERS & CO., OF SAME PLACE.

IMPROVEMENT IN BAILS AND EARS FOR BUCKETS.

Specification forming part of Letters Patent No. 149,594, dated April 14, 1874; application filed December 27, 1873.

*To all whom it may concern:*

Be it known that I, ALFRED MILLER, of Cincinnati, in the county of Hamilton and State of Ohio, have invented certain new and useful Improvements in Bucket Bails and Ears; and I do hereby declare the following to be a full, clear, and exact description of the invention, such as will enable others skilled in the art to which it pertains to make and use it, reference being had to the accompanying drawings, which form part of this specification.

My invention relates to improvement in bucket bails and ears.

In the drawings, Figure 1 represents a side elevation of the invention complete; Fig. 2, a detached view of an ear.

A represents the bail, and B B the ears, constructed of wrought-iron. In the enlarged portion $a$ of the bail A is a swivel-loop, C. The bail and ears are attached to each other by the loops $b$ $b'$. The ears are constructed in one piece, bent around at one end to form the loop $b'$, with a projecting portion, $d$, at each end. The portion D between the loops $b'$ and end $d$ is flat, as shown. The ends of the projecting portion $d$ of the ears are notched, as shown at $c$.

The ears are attached to the opposite sides of a bucket, keg, or cask by driving the projecting portions $d$ through the bucket, the top one being near the rim, and the other a short distance down the side, and the projecting ends clinched or swaged, the notches facilitating this operation.

Having thus described my invention, what I claim as new, and desire to secure by Letters Patent, is—

As an article of manufacture, the combined bucket bail and ears herein described, the latter constructed of flat iron, with its lower end rounded to pass through the side of the bucket, and the other end rounded and bent upon itself to form a loop, and terminating in a prong constructed to pass through the side of the bucket, substantially as described.

In testimony that I claim the foregoing, I have hereunto set my hand this 22d day of December, 1873.

ALFRED MILLER.

Witnesses:
F. H. ROWEHOMP,
B. HUESMAN.